US008887816B2

(12) United States Patent
Liang et al.

(10) Patent No.: US 8,887,816 B2
(45) Date of Patent: Nov. 18, 2014

(54) POLYMER COMPOSITIONS FOR USE IN DOWNHOLE TOOLS AND COMPONENTS THEREOF

(75) Inventors: Feng Liang, Cypress, TX (US); Stanley J. Heath, Duncan, OK (US); Bradley L. Todd, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 650 days.

(21) Appl. No.: 13/193,844

(22) Filed: Jul. 29, 2011

(65) Prior Publication Data

US 2013/0025859 A1 Jan. 31, 2013

(51) Int. Cl.
| | | |
|---|---|---|
| E21B 43/04 | (2006.01) | |
| C09K 8/60 | (2006.01) | |
| E21B 41/00 | (2006.01) | |

(52) U.S. Cl.
CPC ..................................... *E21B 41/00* (2013.01)
USPC .......................................... 166/376; 166/300

(58) Field of Classification Search
USPC .......... 166/192, 300, 317, 376, 387; 528/355; 525/197
See application file for complete search history.

(56) References Cited

U.S. PATENT DOCUMENTS

| | | | |
|---|---|---|---|
| 2,238,671 A | 4/1941 | Woodhouse et al. | |
| 2,703,316 A | 3/1955 | Schneider | |
| 3,173,484 A | 3/1965 | Huitt et al. | |
| 3,195,635 A | 7/1965 | Fast | |
| 3,302,719 A | 2/1967 | Fischer | |
| 3,364,995 A | 1/1968 | Atkins et al. | |
| 3,366,178 A | 1/1968 | Malone et al. | |
| 3,455,390 A | 7/1969 | Gallus | |
| 3,784,585 A | 1/1974 | Schmitt et al. | |
| 3,828,854 A | 8/1974 | Templeton et al. | |
| 3,912,692 A | 10/1975 | Casey et al. | |
| 4,387,769 A | 6/1983 | Erbstoesser et al. | |
| 5,216,050 A | 6/1993 | Sinclair | |
| 6,323,307 B1 | 11/2001 | Bigg et al. | |
| 7,093,664 B2 | 8/2006 | Todd et al. | |
| 7,216,705 B2 * | 5/2007 | Saini et al. | 166/279 |
| 7,353,879 B2 | 4/2008 | Todd et al. | |
| 7,661,481 B2 | 2/2010 | Todd et al. | |
| 7,928,162 B2 | 4/2011 | Kiss et al. | |
| 2004/0014607 A1 * | 1/2004 | Sinclair et al. | 507/200 |
| 2005/0034861 A1 | 2/2005 | Saini et al. | |
| 2005/0065037 A1 * | 3/2005 | Constien | 507/203 |
| 2005/0109502 A1 * | 5/2005 | Slay et al. | 166/179 |

(Continued)

FOREIGN PATENT DOCUMENTS

EP 0 681 087 A2 11/1995

OTHER PUBLICATIONS

International Search Report and Written Opinion for PCT/US12/44545 dated Aug. 6, 2012.

*Primary Examiner* — Daniel P Stephenson
(74) *Attorney, Agent, or Firm* — McDermott Will & Emery LLP; Craig W. Roddy

(57) ABSTRACT

A downhole tool or a component thereof may comprise a plasticized polymer composition that comprises a polymer and a water-soluble plasticizer, wherein the plasticized polymer composition has a first deflection test value. The tool may be exposed to an aqueous-based medium where the water-soluble plasticizer may leach out of the tool such that the plasticized polymer composition has a second deflection test value after exposure to the aqueous-based medium that is less than about 10% of the first deflection test value.

21 Claims, 12 Drawing Sheets

(56) References Cited

U.S. PATENT DOCUMENTS

| | | | |
|---|---|---|---|
| 2005/0181162 A1* | 8/2005 | Mestemacher et al. | 428/36.9 |
| 2005/0205265 A1* | 9/2005 | Todd et al. | 166/376 |
| 2005/0205266 A1* | 9/2005 | Todd et al. | 166/376 |
| 2007/0277979 A1 | 12/2007 | Todd et al. | |
| 2008/0070807 A1* | 3/2008 | Munoz et al. | 507/117 |
| 2008/0202764 A1 | 8/2008 | Clayton et al. | |
| 2010/0101803 A1 | 4/2010 | Clayton et al. | |
| 2010/0273685 A1* | 10/2010 | Saini et al. | 507/210 |
| 2011/0252781 A1 | 10/2011 | Johnson et al. | |
| 2012/0048562 A1* | 3/2012 | Zimmerman et al. | 166/317 |
| 2013/0081801 A1* | 4/2013 | Liang et al. | 166/192 |
| 2013/0123394 A1* | 5/2013 | Breach | 524/25 |
| 2013/0292123 A1* | 11/2013 | Murphree et al. | 166/308.1 |
| 2014/0044974 A1* | 2/2014 | Campbell | 428/422 |

* cited by examiner

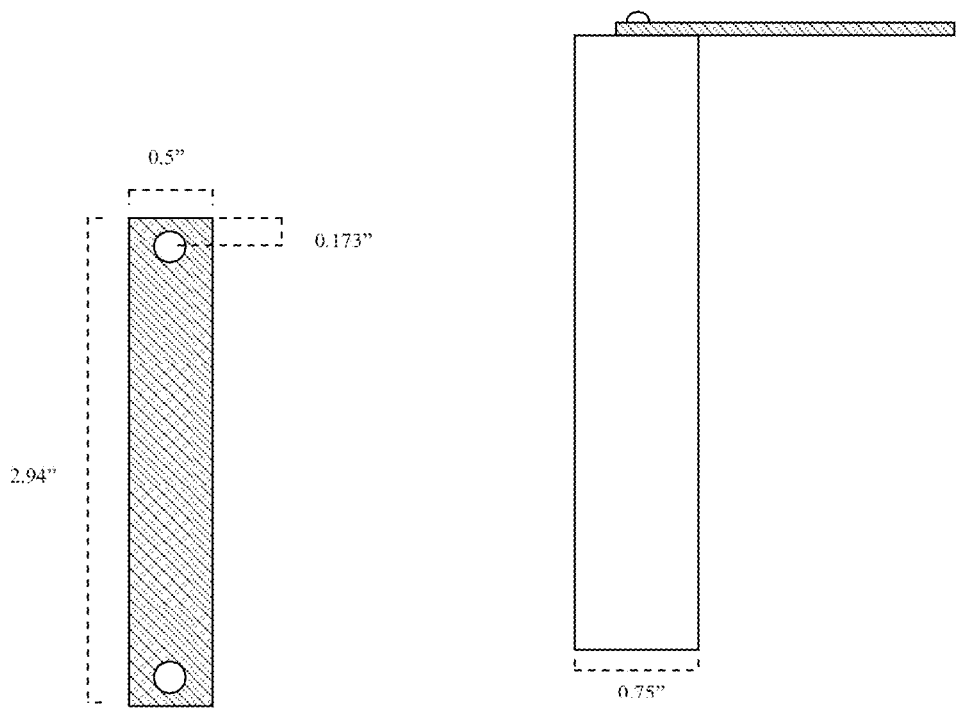
Figure 6A (not to scale)
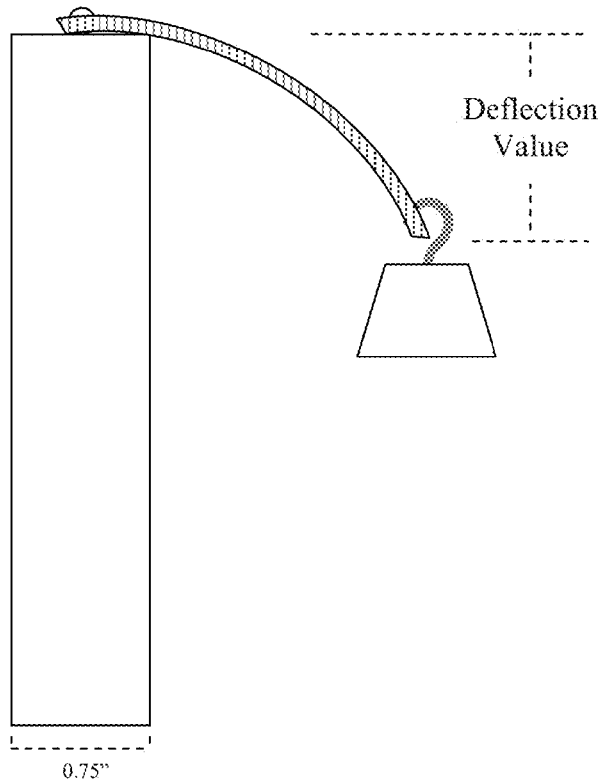
Figure 6B (not to scale)

POLYMER COMPOSITIONS FOR USE IN DOWNHOLE TOOLS AND COMPONENTS THEREOF

BACKGROUND

The present invention relates to improved downhole tools, and more specifically, to improved polymer compositions that are useful in the formation of downhole tools or components thereof.

A wide variety of downhole tools may be used within a wellbore in connection with recovering desirable fluid or reworking a well that extends into a subterranean formation.

Downhole tools or components thereof may be made of polymers or coated with polymers. The polymers may provide for corrosion resistant and lighter weight tools and may be less costly to manufacture relative to metallic downhole tools or components thereof. The manufacturing process for tools or components thereof that comprise polymers involve the polymer being in a molten state for processing, also known as a polymer melt. It is well-known that an increase in molecular weight generally results in an increase in the viscosity of a polymer melt. A polymer melt with a high viscosity can prevent melt-processing of the polymer melt due to physical and/or mechanical limitations of the melt-processing equipment. These limitations can be overcome with an increase in the melt-processing temperatures, which can require specialized equipment, increased safety procedures, and increased energy consumption leading to increased cost and time. Further, if the downhole tool also includes a metal assembly, the manufacturing process can be energy intensive in that the metal assembly is a heat sink so the energy required to keep the polymer melt in a molten form is quite high. Additionally, depending on the other components of the downhole tool, it may be undesirable to heat the tool extensively as it may degrade some components, for example, those made with elastomers.

However, downhole tool manufacturers must balance the cost and difficulty of manufacturing with the tolerable strength and toughness of the final product. A composition that allows improved processing characteristics during the blending and processing steps, e.g., depressed melt temperatures or glass transition temperatures ($T_g$), and provides the necessary strength in downhole environments would be valuable for producing downhole tools or components thereof. It should be noted that as used herein, melt temperature and glass transition temperature of a polymer are not used interchangeable and are not equated.

SUMMARY OF THE INVENTION

The present invention relates to improved downhole tools, and more specifically, to improved polymer compositions that are useful in the formation of downhole tools or components thereof.

In one embodiment, the present invention provides a method comprising: providing a downhole tool or a component thereof comprising a plasticized polymer composition that comprises a polymer and a water-soluble plasticizer, wherein the plasticized polymer composition has a first deflection test value; exposing the downhole tool or the component thereof to an aqueous-based medium; allowing the water-soluble plasticizer to leach out of the downhole tool or the component thereof, wherein the plasticized polymer composition has a second deflection test value after exposure to the aqueous-based medium and wherein the second deflection test value is less than about 10% of the first deflection test value; and placing the downhole tool or the component thereof in a subterranean formation.

In one embodiment, the present invention provides a method comprising: providing a screen comprising a plasticized polymer composition, wherein the plasticized polymer composition comprises a polymer and a water-soluble plasticizer and wherein the plasticized polymer composition has a first deflection test value; placing the screen in a wellbore penetrating a subterranean formation; exposing the screen to an aqueous-based medium; and allowing the water-soluble plasticizer to leach out of the screen; wherein the plasticized polymer composition has a second deflection test value after exposure to the aqueous-based medium and wherein the second deflection test value is less than about 10% of the first deflection test value.

In one embodiment, the present invention provides a method comprising: providing a downhole tool or component thereof comprising a plasticized polymer composition, wherein the plasticized polymer composition comprises a polymer and a water-soluble plasticizer, and wherein the plasticized polymer composition is characterized by a $T_{g(BE)}$; exposing the downhole tool or component thereof to an aqueous-based medium wherein after exposure to the aqueous-based medium the plasticized polymer composition is characterized by $T_{g(AE)}$; allowing the water-soluble plasticizer to leach out of the plasticized polymer composition to the extent that $T_{g(AE)}$ is between about 5° C. and about 100° C. higher than $T_{g(BE)}$; and implementing the downhole tool or component thereof in a subterranean formation.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to those skilled in the art and having the benefit of this disclosure.

FIGS. 6A-B show representations of the components and measurements of the deflection test.

DETAILED DESCRIPTION

Figure 1A:
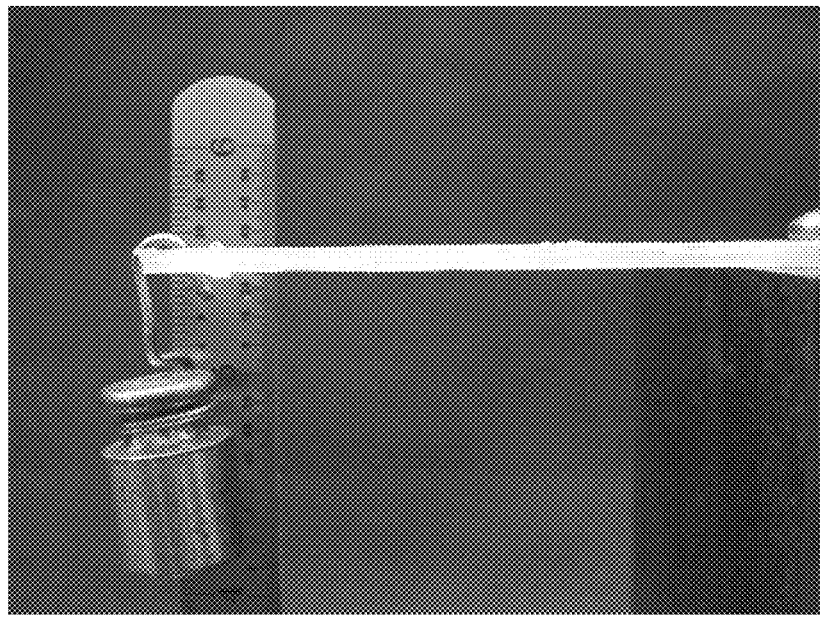
FIGS. 1A-C show photographs of deflection test results as described in the Examples section.

The present invention relates to improved downhole tools, and more specifically, to improved polymer compositions that are useful in the formation of downhole tools or components thereof.

Of the many advantages of the present invention, the present invention provides for improving the mechanical properties of downhole tools or components thereof that are made of polymeric material by incorporating an improved polymeric composition that comprises a water-soluble plasticizer and a polymer. The present invention offers important dual advantages in terms of manufacturing ease and performance. The present invention provides for plasticized polymer compositions that have depressed melt temperatures or glass transition temperatures relative to the unplasticized polymer composition, which increases the ease with which a downhole tool or component thereof may be formed. Additionally, the water-soluble plasticizer may be leached from the plasticized polymer composition in an aqueous environment, which enables the tool to exhibit improved mechanical properties downhole, maybe even returning to the strength of the unplasticized polymer composition. As used herein, "leach" and its derivatives should be taken to mean to remove soluble constituents by the act of a percolating liquid. One skilled in the art will understand the many equivalents to leach including diffuse, strip, remove, and withdraw. As many wellbores or subterranean formations have an aqueous environment, this approach allows for the downhole tool or component thereof to strengthen during installation. Moreover, manufacturing of a downhole tool with a plasticized polymer composition may be advantageous in that the depressed melt temperature or glass transition temperatures may yield less complex, more cost effective, and less time-consuming methods of manufacturing, e.g., extruding into voids, spaces, and pathways of a tool or mold for a tool or component thereof.

In some embodiments, a downhole tool or a component thereof may comprise a plasticized polymer composition. In some embodiments, a plasticized polymer composition comprises a polymer and a water-soluble plasticizer. In some embodiments, a downhole tool or component thereof may further comprise another material including, but not limited to, polymers including thermoplastic polymers, thermoset polymers, and elastomers; composite polymers; metals; ceramics; and any combination thereof. One skilled in the arts would understand the plurality of ways a plasticized polymer composition may be used in a downhole tool or component thereof.

Suitable downhole tools for use in the present invention may be any downhole tool suitable for use in a subterranean formation including, but not limited to, testing downhole tools, perforating downhole tools, completion downhole tools, drilling downhole tools, logging downhole tools, treating downhole tools, circulation valve well downhole tools, packers, well screen assemblies, bridge plugs, frac plugs, kickoff plugs, cementing tools, coil tubing, casing, and fishing downhole tools. It should be understood by one skilled in the art that a downhole tool, as described herein, does not include particulates or fluid additives.

Figure 7A:
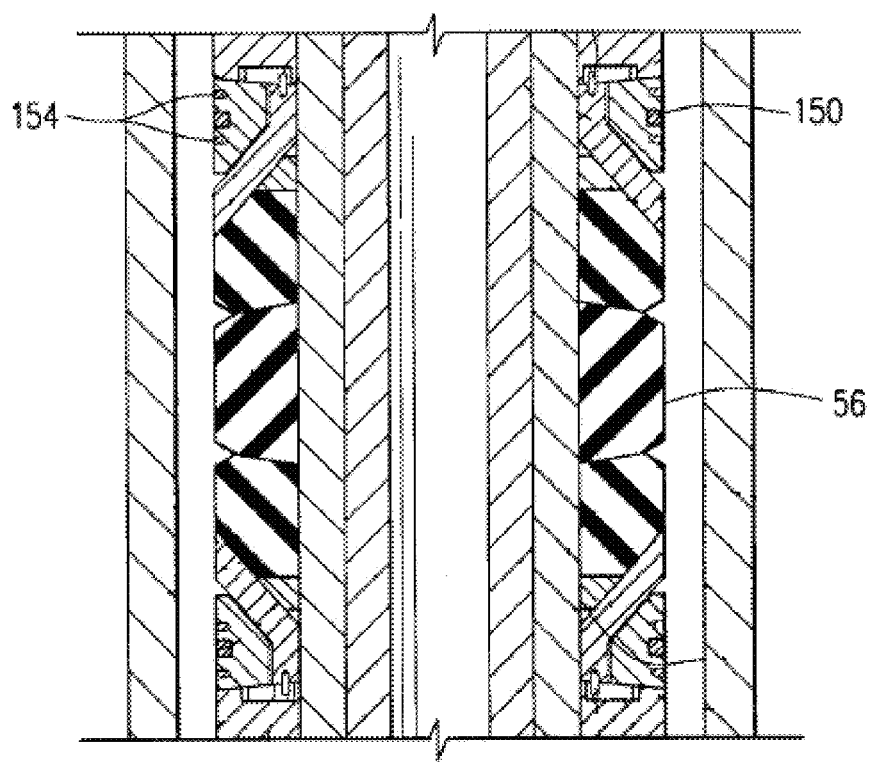
FIGS. 7A-C show representations of downhole tools and components thereof suitable to comprise a plasticized polymer according to the present invention.

In some embodiments, a plasticized polymer composition may be the only material of a downhole tool or component thereof. By way of nonlimiting example as illustrated in FIG. 7A, a packer may have a packer component, like an o-ring 150 or a retaining band 154, that comprises only a plasticized polymer composition.

Figure 7B:
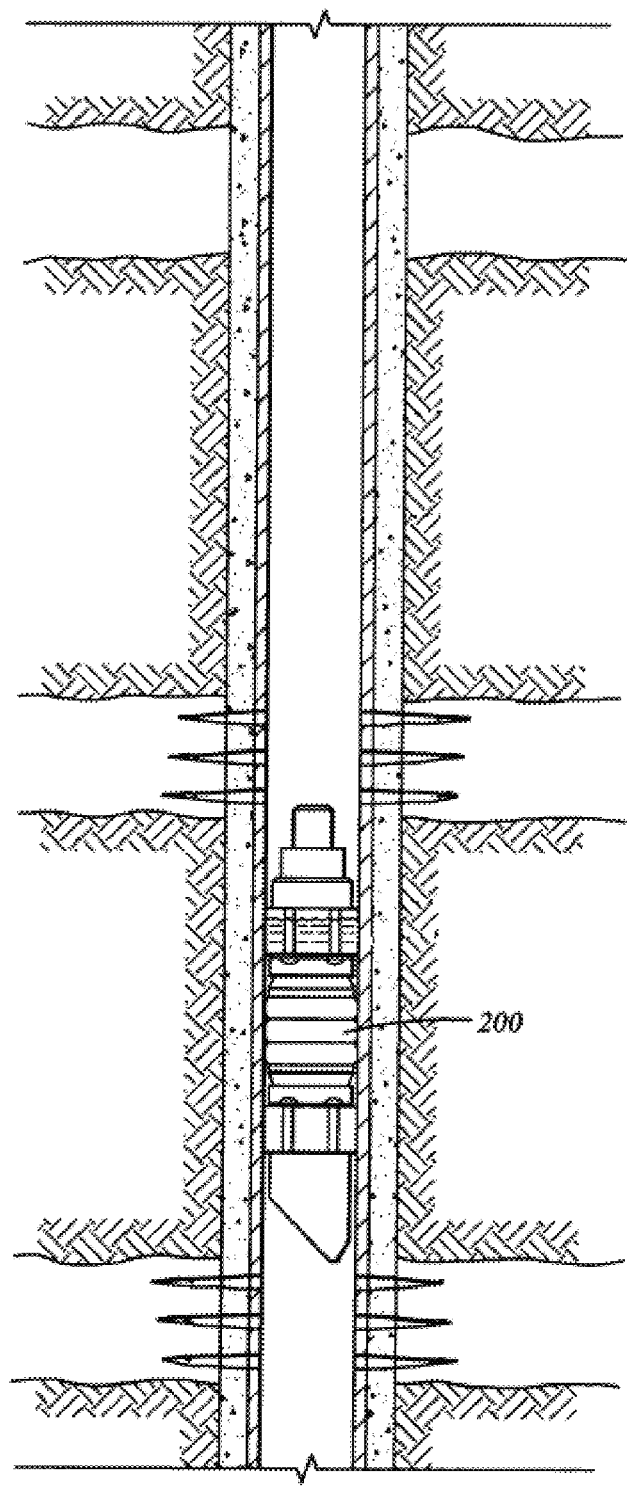

In some embodiments, a plasticized polymer composition may be part of a composite material either as the matrix material or a component added to a matrix material. By way of nonlimiting example as illustrated in FIG. 7B, a downhole tool may be a composite frac plug 200 with a plasticized polymer composition as the matrix with carbon fibers as an additive.

Figure 7C:
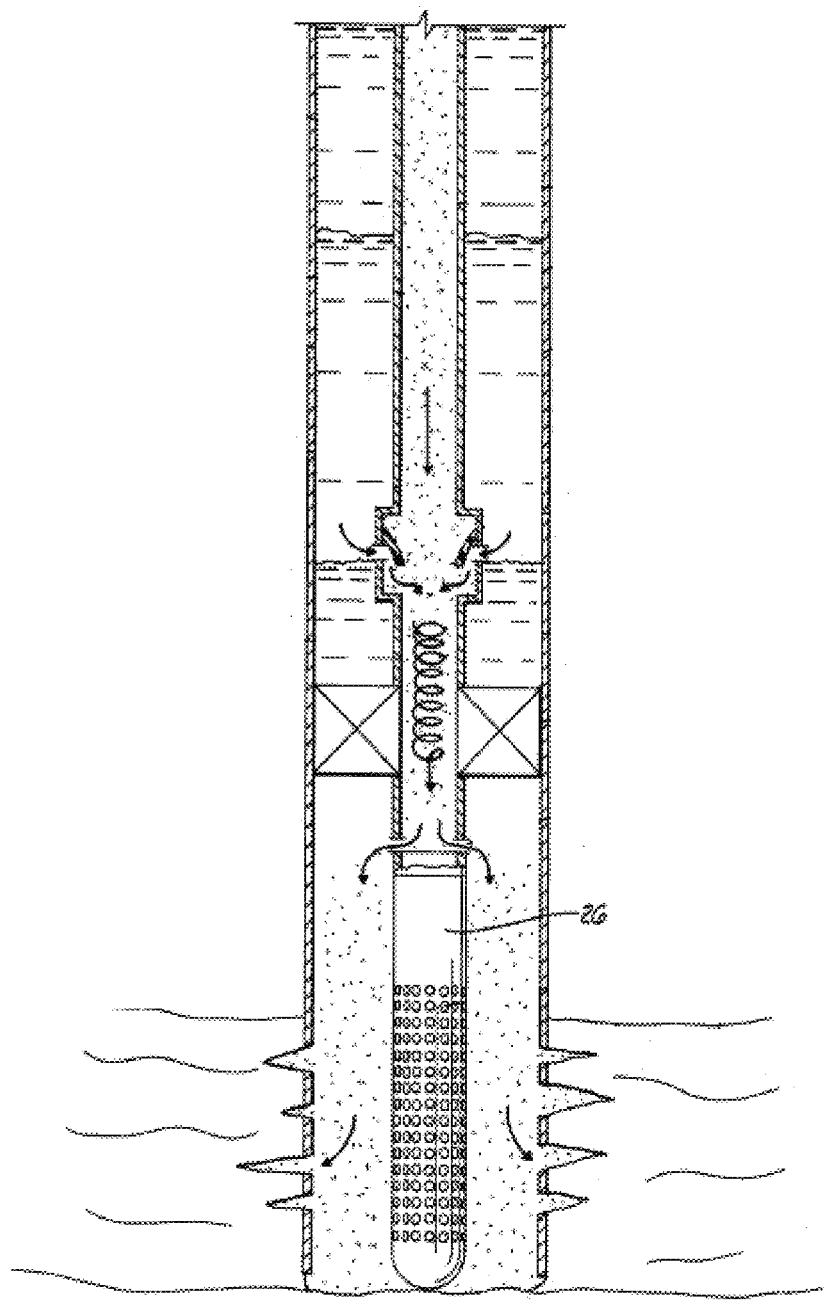

In some embodiments, a plasticized polymer composition may be a coating on all or part of a downhole tool and/or component thereof. One skilled in the art should understand that a frame may also be referred to as a support, a skeleton, or a scaffold. By way of nonlimiting example as illustrated in FIG. 7C, a downhole tool may be a metal screen 26 with a plasticized polymer composition coating thereon. One skilled in the art should understand that coatings may be of variable thicknesses.

In some embodiments, a downhole tool or a component thereof may comprise a plasticized polymer composition with a frame. One skilled in the art should understand that a frame may also be referred to as a support, a skeleton, or a scaffold. By way of nonlimiting example as illustrated in FIG. 7C, screen 26 may comprise a relatively thin metal frame with a thick coating of plasticized polymer composition such that the plasticized polymer composition comprises over 75% of the screen by volume.

In some embodiments, a plasticized polymer composition may be used in a downhole tool or component thereof in more than one way. By way of nonlimiting example as illustrated in FIG. 7A, a packer may have a plasticized polymer composition o-ring 150 and a packer element 56 comprising a plasticized polymer composition matrix with carbon fiber reinforcement.

One skilled in the art would understand the plurality of methods available to manufacture a downhole tool or component thereof comprising a plasticized polymer composition. Suitable methods may include, but not be limited to, machining, casting, molding, extruding, spraying, painting, dipping, infusing, and any combination thereof. By way of nonlimiting example, a downhole tool may comprise a porous ceramic that is infused with a plasticized polymer composition. Another example may include extruding a plasticized polymer composition into a metal screen. The advantages of using a plasticized polymer composition as described herein, may be that the reduction in melt temperature yields easier manufacturing or provides for previously unrealized manufacturing techniques.

In some embodiments, a plasticized polymer composition comprises a polymer and a water-soluble plasticizer. In some embodiments, a plasticized polymer composition consists essentially of a polymer and a water-soluble plasticizer. In some embodiments, a plasticized polymer composition consists of a polymer and a water-soluble plasticizer.

Suitable polymers for use in the present invention may be any known polymer suitable for use in a downhole tool or component thereof including, but not limited to, elastomers, thermoset polymers, and thermoplastic polymers. Polymers for use in the present invention may be a derivative, a copolymer, and a combination of polymers suitable for use in a downhole tool or component thereof. Polymers for use in the present invention may be degradable or nondegradable.

Suitable elastomers may include, but not be limited to, nitriles; a copolymer of acrylonitrile and butadiene; carboxylated acrylonitrile butadiene; hydrogenated acrylonitrile butadiene, commonly referred to as highly saturated nitrile; carboxylated hydrogenated acrylonitrile butadiene; and hydrogenated carboxylated acrylonitrile butadiene. Suitable polymers may include, but not be limited to, a fluorocarbon, such as tetrafluoroethylene and perfluoroelastomer. Suitable polymers may be polychloroprene rubber, natural rubber, polyether urethane, styrene butadiene rubber, ethylene propylene, ethylene propylene diene, and similar elastomers.

Suitable thermoplastic polymers may include, but not be limited to, polyphenylene sulfide, polyetherketone-ketone, polyetheretherketone, polyetherketone, polytetrafluoroethylene, polysulphones, polyesters, and any combination thereof. Examples of polyesters may include, but not be limited to, homopolymers, random, block, graft, and star- and hyperbranched aliphatic polyesters. Polycondensation reactions, ring-opening polymerizations, free radical polymerizations, anionic polymerizations, carbocationic polymerizations, coordinative ring-opening polymerization, and any other suitable process may prepare such suitable polymers. Specific examples of suitable polymers may include, but are not limited to, polyanhydrides such as poly(adipic anhydride), poly(suberic anhydride), poly(sebacic anhydride), poly(dodecanedioic anhydride), poly(maleic anhydride), and poly(benzoic anhydride); polysaccharides such as dextran or cellulose; chitin; chitosans; proteins; aliphatic polyesters; poly(lactides); poly(glycolides); poly($\epsilon$-caprolactones); poly(hydroxybutyrates); poly(anhydrides); aliphatic polycarbonates; poly(amino acids); poly(ethylene oxides); and polyphosphazenes. Suitable polymers may include, but not be limited to, poly(orthoesters). Aliphatic polyesters may be prepared by substantially any of the conventionally known manufacturing methods such as those described in U.S. Pat. Nos. 6,323,307; 5,216,050; 4,387,769; 3,912,692; and 2,703,316, which are hereby incorporated herein by reference in their entirety.

Suitable thermoset polymers may include, but not be limited to, oil-resistant thermoset resins such as acrylic-based resins, epoxy-based resins, furan-based resins, phenolic-based resins, phenol/phenol formaldehyde/furfuryl alcohol resins, and polyester resins.

Other suitable polymers may include, but not be limited to, poly(vinyl alcohol), polyamide 6 (Nylon 6), polyamide 6/6 (Nylon 6/6), acrylic, acrylonitrile butadiene styrene, ethylene vinyl alcohol, polycarbonate/polyethylene terephthalate polyester blend, polyethylene terephthalate, unreinforced polycarbonate/polybutylene terephthalate blend, polyetherimide, polyphenylene ether, molded polyphenylene sulfide, heat resistant grade polystyrene, polyvinylbenzene, polyphenylene oxide, a blend of polyphenylene oxide and nylon 6/6, acrylonitrile-butadiene-styrene, polyvinylchloride, fluoroplastics, polysulfide, polypropylene, styrene acrylonitrile, polystyrene, phenylene oxide, polyolefins, polystyrene divinylbenzene, polyfluorocarbons, and polyamide imides.

Suitable plasticizers for use in the present invention may be any known water-soluble plasticizer or derivative thereof. As used herein, water-soluble plasticizer refers to both plasticizers that themselves are water-soluble and plasticizers that hydrolyze to water-soluble forms when exposed to downhole condition. Examples of suitable plasticizers include, but are not limited to, polyols such as glycerol, propylene glycol and polyethylene glycol (PEG); diacetyl monoacyl glycerol; polypropylene glycol (and epoxy derivatives thereof); polyethylene oxide; oligomeric lactic acid and derivatives thereof; organic esters such as citrate esters, e.g., tributyl citrate oligomers, triethyl citrate, acetyltributyl citrate, acetyltriethyl citrate, trioctyl citrate, acetyl trioctyl citrate, trihexyl citrate, acetyl trihexyl citrate and trimethyl citrate; 1,2-cyclohexane dicarboxylic acid diisononyl ester; alkyl sulfonic acid phenyl ester; glucose monoesters; partially fatty acid esters; PEG monolaurate; acetic esters including triacetin; poly($\epsilon$-caprolactone); poly(hydroxybutyrate); glycerin-1-benzoate-2,3-dilaurate; glycerin-2-benzoate-1,3-dilaurate; ethylphthalylethyl glycolate; glycerine diacetate monocaprylate; poly(propylene glycol) dibenzoate, dipropylene glycol dibenzoate; ethyl phthalyl ethyl glycolate; poly(ethylene adipate) disterate; and adipate-based plasticizers such as di-isobutyl adipate and bis(butyl diethylene glycol)adipate. One or more water-soluble plasticizers may be added, as combinations may increase the efficacy of the desired result. One skilled in the art, with the benefit of this disclosure, should understand that the plasticizer and polymer of the plasticized polymer should be compatible, i.e., the plasticizer should be able to solvate the polymer. One skilled in the art should further understand that the plasticizer and polymer combination may be chosen based on a desired glass transition temperature of the resultant plasticized polymer and the effective concentration of a plasticizer that can be incorporated into a polymer.

In some embodiments, the water-soluble plasticizer, e.g., an ester, may degrade to form a useful product, e.g., an acid. As used herein, "degrade" and its equivalents refer to the conversion of materials into smaller components, intermediates, or end products by the result of solubilization, hydrolytic degradation, biologically formed entities (e.g., bacteria or enzymes), chemical reactions, thermal reactions, reactions induced by radiation, or any other suitable mechanism. The rate at which such plasticizers degrade may depend on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the water-soluble plasticizer is subjected may affect how it degrades, e.g., temperature, presence of moisture, oxygen, microorganisms, enzymes, pH, and the like. In some embodiments, an external stimuli may interact with the water-soluble plasticizer to initiate or effect the rate of degradation, e.g., adjustment of pH with the introduction of an acid or a base into the wellbore. In choosing a degradable water-soluble plasticizer, one should consider the degradation products that will result. These degradation products should not adversely affect other operations or components.

It should be noted that when "about" is provided at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

In some embodiments, the amount of water-soluble plasticizer may be present in the plasticized polymer composition in an amount ranging from a lower limit of about 1%, 5%, 10%, or 25% to an upper limit of about 50%, 40%, or 25%, and wherein the ratio of water-soluble plasticizer to polymer may range from any lower limit to any upper limit and encompass any subset between the upper and lower limits.

In some embodiments, a water-soluble plasticizer may leach out of a plasticized polymer composition in the presence of an aqueous-based medium. In some embodiments, a water-soluble plasticizer may leach out of a plasticized polymer composition in amounts ranging from a lower limit of about 1%, 5%, 10%, 25%, 50%, or 75% of the initial concentration of water-soluble plasticizer in the plasticized polymer composition to an upper limit of 100%, 99.9%, 99%, 95%, 90%, 75%, or 50% of the initial concentration of water-soluble plasticizer in the plasticized polymer composition, and wherein the amount of water-soluble plasticizer leached from the plasticized polymer composition may range from any lower limit to any upper limit and encompass any subset between the upper and lower limits. Measuring the amount of water-soluble polymer that has or can leach from a polymer may be tested by thermogravimetric analysis (TGA). TGA measurement to determine the amount of plasticizer in a plasticized polymer composition may be performed on a TA Instruments Model Q500. Measurements are conducted in platinum pans with about 20 mg of sample under $N_2$ atmosphere with a flow rate of 100 mL/min. The thermal profile of a scan is from room temperature to 450° C. in high-resolution mode, i.e., sensitivity of 1.00, ramp rate of 100° C./min, and resolution of 3.00. One skilled in the art would understand how to determine the amount of plasticizer in a plasticized polymer composition from the TGA measurements run under these conditions.

In some embodiments, the plasticized polymer composition may further comprise an additive. Suitable additives include, but are not limited to, particulates, fibers, dyes, tracers, water-insoluble plasticizers, and any combination thereof. It should be understood that the term "particulate" or "particle," as used in this disclosure, includes all known shapes of materials, including, but not limited to, spherical materials, substantially spherical materials, low to high aspect ratio materials, fibrous materials, polygonal materials (such as cubic materials), and mixtures thereof. One skilled in the art should understand which additive(s) and at what concentration should be added to the plasticized polymer composition to achieve a desired outcome. Optionally, stabilizing agents in the form of anti-oxidants and water scavengers may be added.

In some embodiments, a plasticized polymer composition may comprise a polymer, a water-soluble plasticizer, and a water-insoluble plasticizer. In some embodiments when exposed to an aqueous-based medium, a plasticized polymer composition comprising a polymer, a water-soluble plasticizer, and a water-insoluble plasticizer may leach the water-soluble plasticizer and not the water-insoluble plasticizer.

One skilled in the art should understand the plurality of methods available to produce a plasticized polymer composition from a water-soluble plasticizer and a polymer with or without any optional additives. Suitable methods may include, but not be limited to, melt-blending processes, infusion processes, concentration gradient or diffusion processes, solvent strip processes, and any combination thereof. As used herein, "solvent strip process" should be understood to be a method where at least two components are mixed with the aid of a solvent system that is later removed. Solvent strip process may be an expensive process due to the need for redissolving the polymer and possibly the plasticizer blend components and also due to the cost of solvent handling. Recently, an in-line process for producing plasticized polymer and plasticized polymer blends was disclosed in U.S. Pat. No. 7,928, 162, which is hereby incorporated herein by reference in its entirety.

An aqueous-based medium suitable for use in the present invention may comprise fresh water, saltwater (e.g., water containing one or more salts dissolved therein), brine (e.g., saturated salt water), seawater, or combinations thereof. Generally, the aqueous-based medium may be from any source, provided that it does not contain components that might adversely affect the stability and/or performance of other operations or components. In some embodiments, the characteristics of the aqueous-based medium, like pH, temperature, and/or salinity, may be adjusted for among other purposes, to enhance or retard leaching of the plasticizer from the plasticized polymer composition. One of ordinary skill in the art, with the benefit of this disclosure, will recognize when such adjustments are appropriate. Further, the aqueous-based medium may comprise a water-miscible solvent, e.g., an alcohol, a glycol, and/or an ether. In some embodiments, the aqueous-based medium may be substantially a water-miscible solvent. In some embodiments, the aqueous-based medium may be an oil-in-water emulsion including with a water phase comprising a water-miscible solvent. In some embodiments, the aqueous-based medium may be foamed. In some embodiments, the aqueous-based medium may be native to the subterranean formation or wellbore, may not be native to the subterranean formation or wellbore, or any combination thereof. In some embodiments, the aqueous-based medium may be installed into the subterranean formation or wellbore before, during, or after insertion of the downhole tool or component thereof.

In some embodiments, the plasticized polymer composition may be exposed to an aqueous-based medium before insertion into the wellbore or subterranean formation, after insertion into the wellbore or subterranean formation, during insertion into the wellbore or subterranean formation, and any combination thereof. In some embodiments, the plasticized polymer composition may be exposed to an aqueous-based medium on-site or off-site of the wellbore. In some embodiments, the plasticized polymer composition may be exposed to an aqueous-based medium as a step in the manufacturing process.

In some embodiments, a downhole tool or component thereof that comprises a plasticized polymer composition according to the present invention may be inserted or installed in a wellbore or a subterranean formation. Suitable subterranean formation for use in the present invention includes any subterranean formation. By way of nonlimiting example, a frac plug comprising a plasticized polymer composition may be used in a shale formation. Another example may include using a screen comprising a plasticized polymer composition in an unconsolidated formation. One of ordinary skill in the art, with the benefit of this disclosure, should understand the characteristics of the wellbore and subterranean formation to account for when determining the type of downhole tool, the plasticized polymer composition, and the manner in which the plasticizer is incorporated with the downhole tool or component thereof. Some characteristics to consider may include temperature and differential pressure.

In some embodiments, a water-soluble plasticizer may leach out of a plasticized polymer composition in the presence of an aqueous-based medium thereby improving the mechanical properties of the plasticized polymer composition which may be measured by differences in their respective deflection test values. A deflection test may be a way to measure the strength of a polymer and/or plasticized polymer composition. The deflection test is defined by the following procedure. Test strips are made 0.1" thick by 2.94" long by 0.5" wide. A #10 hole is drilled through the thickness of the test strip at 0.173" from the end of the 2.94" dimension (one hole drilled in each end) and centered on the 0.5" dimension as shown in FIG. 6A. A test fixture of a ¾" thick steel plate (3"×5") stands on edge (stands 5" tall) with a #10-24 threaded hole centered in the top edge of the plate as shown in FIG. 6A. One end of the test strip is bolted to the test fixture with a #10 screw with a round screw head that is 0.36" in diameter as shown in FIG. 6A. A 20 gram weight is hung from the free end by clipping it into the hole of the free end such that the 20 gram weight's center of gravity is in line with the free end. A deflection test value is measured from the unweighted height of the free end as shown in FIG. 6B. In some embodiments, a first deflection test value may be taken of a test strip before exposure to an aqueous-medium and a second deflection test may be taken after exposure to the aqueous-based medium. In some embodiments, the second deflection test value may be less than about 25%, 10%, 5%, or 1% of the first deflection test value. One skilled in the arts would understand that comparative data should be collected under the same conditions including, but not limited to, temperature.

One skilled in the art would understand that the deflection test results may be used as an indication of other properties of plasticized polymer composition including, but not limited to, resistance or favorability to extrusion, ability to withstand differential pressures within a wellbore, and the like.

In some embodiments, a water-soluble plasticizer may leach out of a plasticized polymer composition in the presence of an aqueous-based medium thereby increasing the physical properties of the plasticized polymer composition which may be measured by differences in their respective glass transition temperature ($T_g$). Glass transition is a method to characterize a property of a polymeric material. The glass transition is the temperature where the amorphous regions of the polymer between the glassy and rubbery state occurs. For the purposes of this application, glass transition temperature can be determined from the DSC graph as a change in the heat capacity that what one skilled in the art would describe as the transition from the glass state to the rubber state of the polymer. This may be recognized by one skilled in the art as an endothermic transition from the glass state to the rubber state of the polymer.

$T_g$ can be determined by Differential Scanning calorimetry (DSC). DSC is carried out with hermatic pans under $N_2$ atmosphere on approximately 10 mg of sample using a Model Q200 from TA Instruments. The scans are run first from −50° C. to 200° C. at a ramp rate of 10° C./min, then ramped down to −50° C. at a ramp rate of 5° C./min, and finally a second ramp to 200° C. at a ramp rate of 10° C./min. $T_g$ is determined based on the data of the second heating cycle. For the purposes of this application, $T_g$ can be determined from the DSC graph at the inflection point of the observed endothermic transition that what one skilled in the art would describe as the transition from the glass state to the rubber state of the polymer. It should be noted that unless otherwise specified, $T_g$ is measured in ° C. In some embodiments, the $T_{g(AE)}$ (after exposure to an aqueous-based medium) may be higher than $T_{g(BE)}$ (before exposure to an aqueous-based medium) by an amount ranging from a lower limit of about 5° C., 10° C., 20° C., or 25° C. to an upper limit of about 100° C., 75° C., 50° C., 40° C., 30° C., or 25° C., and wherein the difference may range from any lower limit to any upper limit and encompass any subset between the upper and lower limits.

In some embodiments when exposed to an aqueous-based medium, a plasticized polymer composition comprising a polymer, a water-soluble plasticizer, and a water-insoluble plasticizer may leach the water-soluble plasticizer and not the water-insoluble plasticizer. This may allow for a change in the properties of the plasticized polymer composition to a level different than that of the polymer of the plasticized polymer composition. In some embodiments, a water-insoluble plasticizer may be included in a plasticized polymer composition to vary and/or optimize the mechanical properties that the plasticized polymer composition will have after exposure to water to each of the water-soluble plasticizer.

In one embodiment, a downhole tool or component thereof that generally has a plasticized polymer composition incorporated therein may be provided. A plasticized polymer composition generally may be made of a polymer and a water-soluble plasticizer. The downhole tool or component thereof may then be exposed to an aqueous-based medium which may allow the water-soluble plasticizer to each out of the plasticized polymer composition. The plasticized polymer composition before and after exposure to the aqueous-based medium may have a first and second deflection test value, respectively, such that the second deflection test value is less than about 10% of the first deflection test value. The downhole tool or component thereof may be used in a subterranean formation.

In another embodiment, a screen may generally have a plasticized polymer composition incorporated therein. A plasticized polymer composition generally may be made of a polymer and a water-soluble plasticizer. The screen may be exposed to an aqueous-based medium which may allow the water-soluble plasticizer to each out of the plasticized polymer composition. The plasticized polymer composition before and after exposure to the aqueous-based medium may have a first and second deflection test value, respectively, such that the second deflection test value is less than about 10% of the first deflection test value. The screen may be used in a wellbore.

In another embodiment, a downhole tool or component thereof that generally has a plasticized polymer composition incorporated therein may be provided. A plasticized polymer composition generally may be made of a polymer and a water-soluble plasticizer. The downhole tool or component thereof may then be exposed to an aqueous-based medium which may allow the water-soluble plasticizer to leach out of the plasticized polymer composition. The plasticized polymer composition before and after exposure to the aqueous-based medium may have a glass transition temperature of $T_{g(BE)}$ and $T_{g(AE)}$, respectively, such that $T_{g(AE)}$ is about 5° C. to about 100° C. higher $T_{g(BE)}$. The downhole tool or component thereof may be used in a subterranean formation.

Providing a downhole tool comprising a plasticized polymer composition, wherein the plasticized polymer composition comprises a polymer and a water-soluble plasticizer, and wherein the plasticized polymer composition is characterize by a $T_{g(BE)}$; exposing the downhole tool to an aqueous-based medium wherein after exposure to the aqueous-based medium the plasticized polymer composition is characterized by $T_{g(AE)}$; allowing the water-soluble plasticizer to each out of the plasticized polymer composition to the extent that $T_{g(AE)}$ is between about 5° C. and about 100° C. higher than $T_{g(BE)}$; and implementing the downhole tool in a subterranean formation.

It should be noted that the present invention may be extended to plasticized polymer wherein the plasticizer is any compound that reduces the glass transition temperature of the polymer and wherein the plasticizer can leach out of the polymer into a fluid environment. By way of nonlimiting example, a plasticizer may be a volatile organic compound that leaches out of the polymer into a gaseous or a liquid environment. In some embodiments, leaching may be assisted by reducing the pressure to below about atmospheric pressure. In some embodiments, leaching may be assisted by increasing the temperature to above about room temperature. One skilled in the art, with the benefit of this disclosure, should understand that the provided plasticizers herein may be leached into a gaseous environment and the necessary increased temperature and/or reduced pressure to achieve leaching into a gaseous environment.

To facilitate a better understanding of the present invention, the following examples of preferred embodiments are given. In no way should the following examples be read to limit, or to define, the scope of the invention.

EXAMPLES

Differential Scanning Calorimetry (DSC)

DSC measurements were carried out with hermatic pans under $N_2$ atmosphere on approximately 10 mg of sample using a TA Instruments Model Q200. The scans were run from −50° C. to 200° C. at a ramp rate of 10° C./min (except that plasticized poly(lactic acid) not treated with water was run to 260° C.). The scan then proceeded to ramp down to −50° C. at a ramp rate of 5° C./min followed by a second ramp to 200° C. at a ramp rate of 10° C./min. All glass transition temperatures ($T_g$) reported were determined from the second heating cycle.

Thermogravimetric Analysis (TGA).

TGA was performed on a Q500 from TA Instruments to determine the amount of water-soluble plasticizer in the polymer. Measurements were conducted in platinum pans with about 20 mg of sample under $N_2$ atmosphere with a flow rate of 100 mL/min. The thermal profile of a scan was from room temperature to 450° C. in high-resolution mode, i.e., sensitivity of 1.00, ramp rate of 100° C./min, and resolution of 3.00. As the water-soluble plasticizer used was triacetin with a boiling point of 258° C., the weight percent at 290° C. was used to determine the weight percent of water-soluble plasticizer in the sample being tested.

Deflection Test.

Test strips of polyesters (with and without plasticizers) were made 0.1" thick by 2.94" long by 0.5" wide. A #10 hole was drilled through the thickness of the test strip at 0.173" from the end of the 2.94" dimension (one hole drilled in each end) and centered on the 0.5" dimension, FIG. 6A. A fixture of a ¾" thick steel plate (3"×5") stood on edge (stands 5" tall) with a #10-24 threaded hole centered in the top edge of the plate. One end of the test strip was bolted to the test fixture with a #10 screw with a round screw head that was 0.36" in diameter, FIG. 6A. A 20 gram weight was hung from the free end by clipping it into the hole of the free end such that the 20 gram weight's center of gravity is in line with the free end. Deflection test values were measured from the unweighted height of the free end, FIG. 6B.

Example 1

A poly(lactic acid) sample was plasticized with triacetin. A Brabender twin-screw mixer was pre-heated to 135° C. 40 g of poly(lactic acid) (PLA) and 12 grams of triacetin were loaded into the mixer. The melt was blended for 5 minutes at a rotor speed of 30 RPM. The mixture was removed from the mixer and molded in a plate mold of 3"×6" with 0.1" thickness resulting in a plurality of test strips.

Figure 1B:
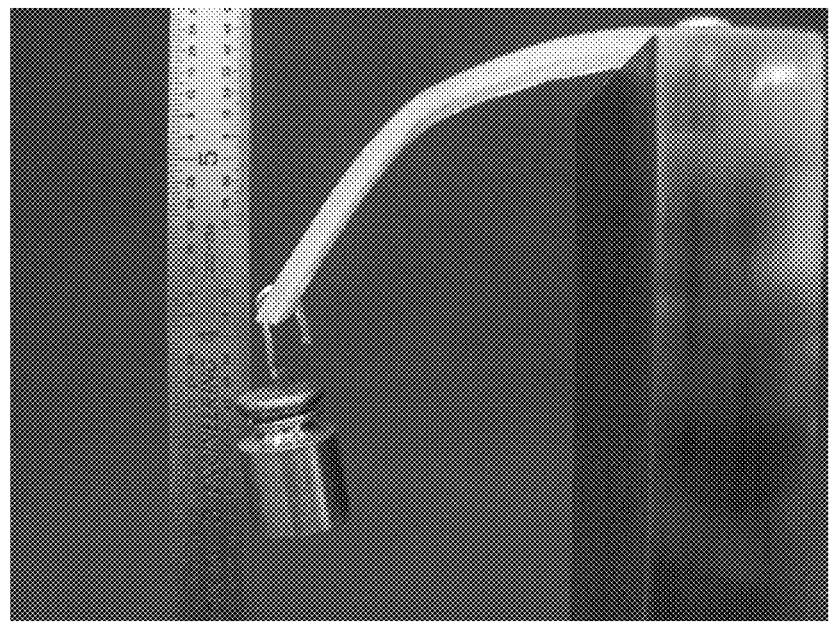
Figure 1C:
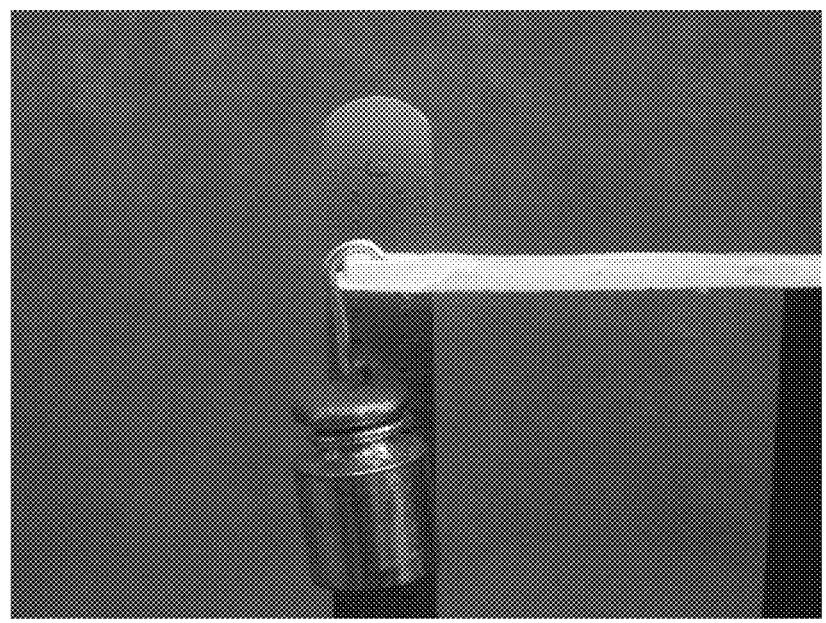
Figure 2A:
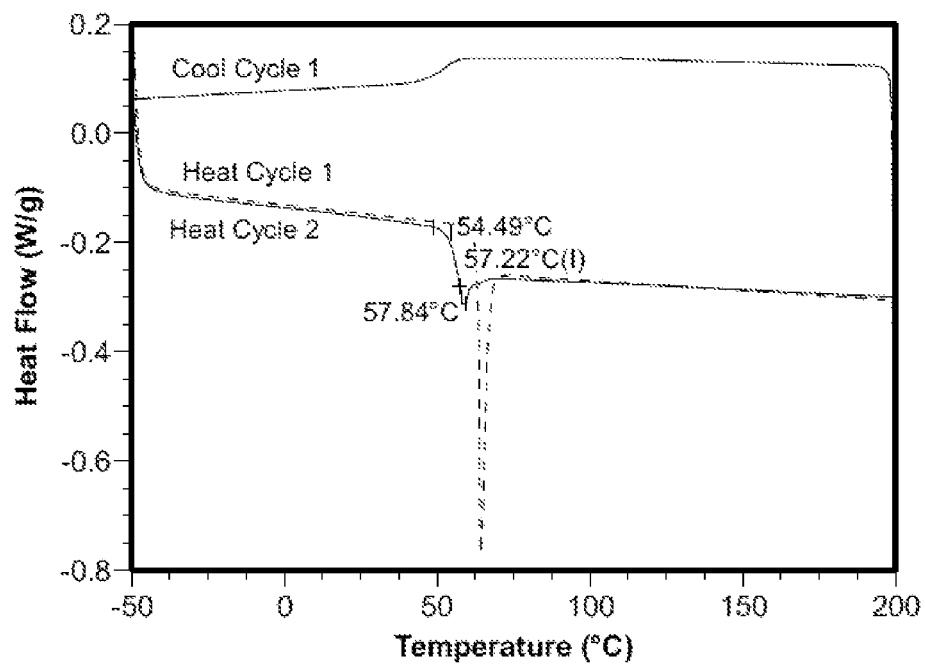
FIGS. 2A-C show differential scanning calorimetry results as described in the Examples section.
Figure 2B:
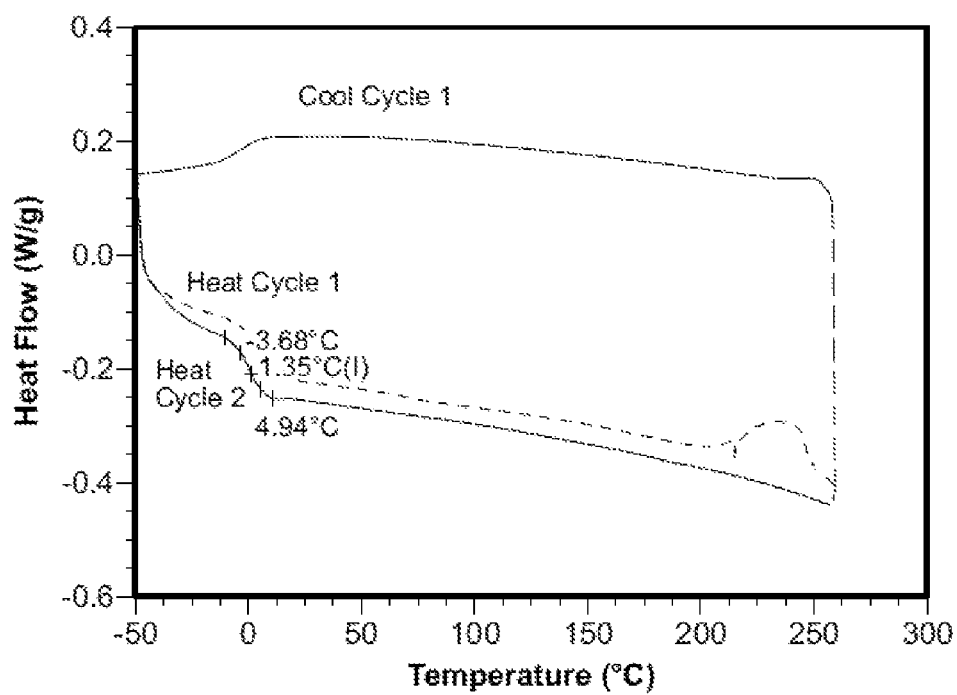
Figure 2C:
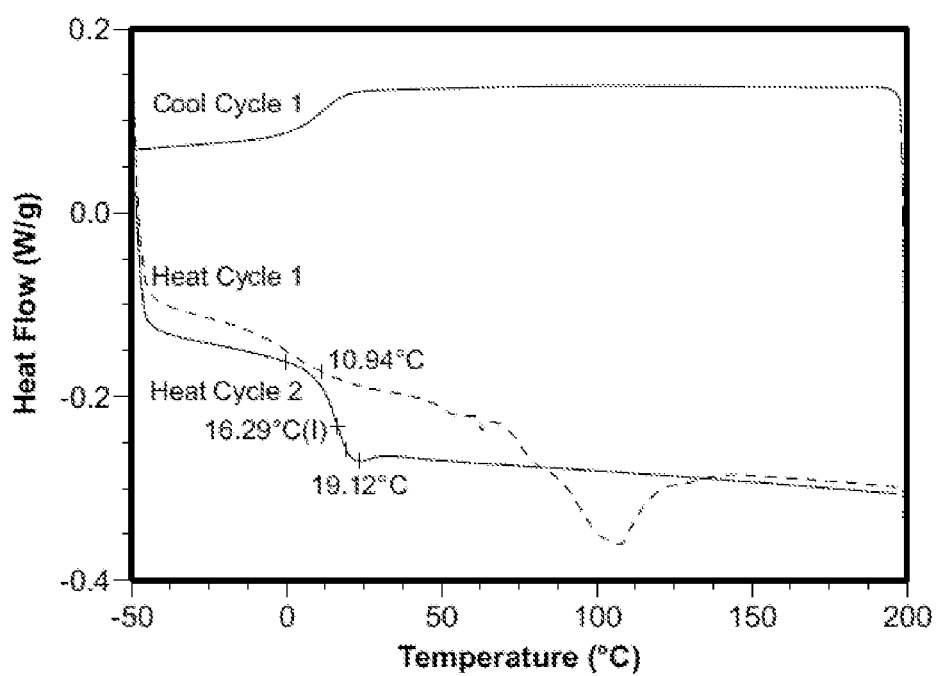
Figure 3A:
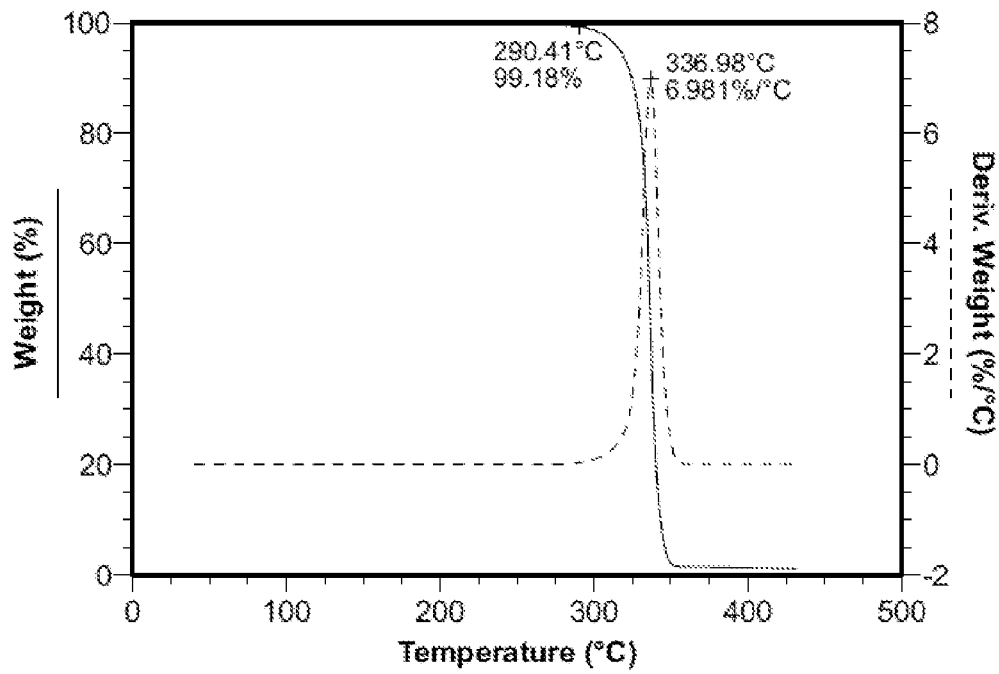
FIGS. 3A-C show thermogravimetric analysis results as described in the Examples section.
Figure 3B:
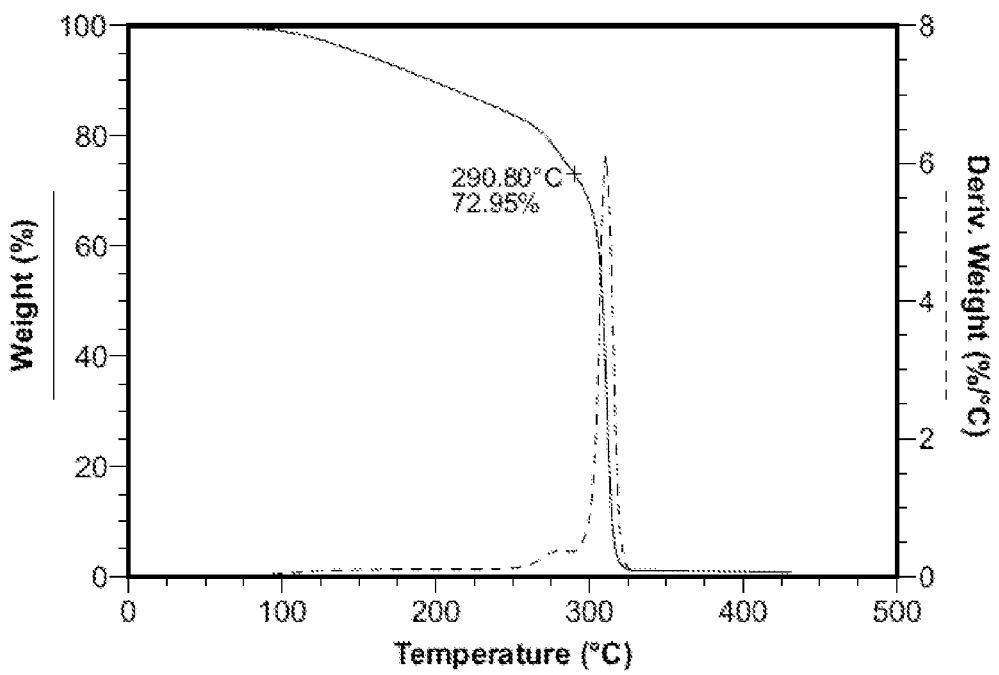
Figure 3C:
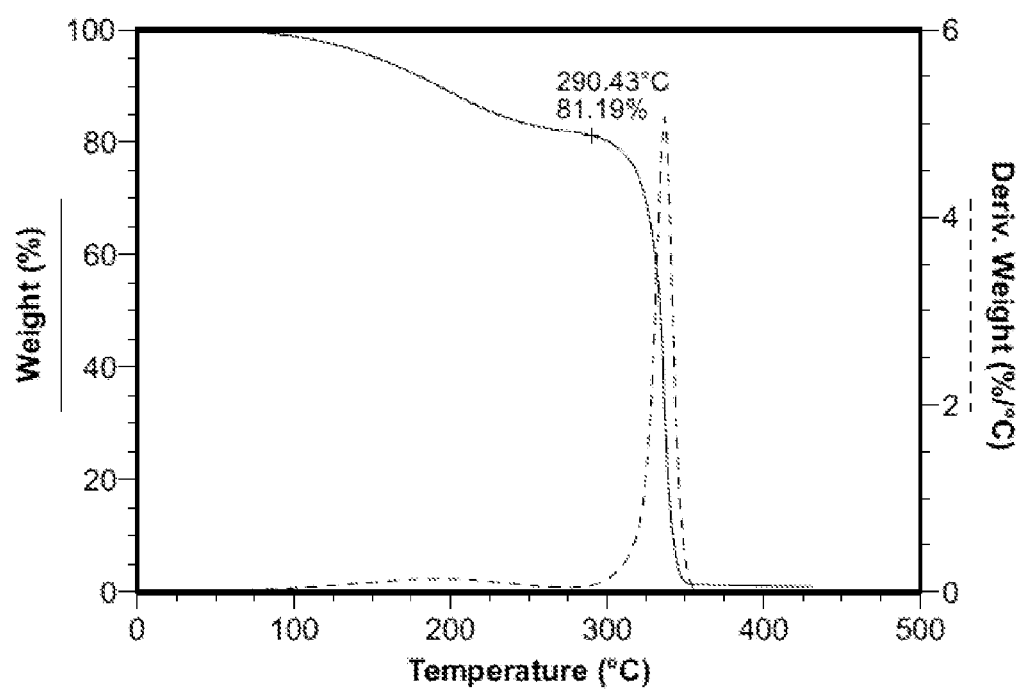

Four test strips were cut to 2.94"×0.5"×0.1" and soaked in 4 different jars containing tap water. The jars were kept in a 120° C. water bath. Each test strip was taken out each day for 4 days. DSC, TGA, and deflection tests were performed on each test strip as outlined above. The results with unplasticized amorphous PLA as the control are outlined in Table 1. The data collected which corresponds to specific results below are provided in the figures, specifically, unplasticized amorphous PLA with results from the deflection test (FIG. 1A), DSC (FIG. 2A), and TGA (FIG. 3A); PLA plasticized with triacetin with results from the deflection test (FIG. 1B), DSC (FIG. 2B), and TGA (FIG. 3B); and PLA plasticized with triacetin with 3 day soak at 120° C. with results from the deflection test (FIG. 1C), DSC (FIG. 2C), and TGA (FIG. 3C).

TABLE 1

| Sample | $T_g$* (° C.) | Weight Loss at 290° C. (%) | Deflection Test Value (in) |
| --- | --- | --- | --- |
| PLA (unplasticized) | 57 | 0.8 | 0.03125 |
| PLA plasticized with triacetin | 1 | 27.1 | 1.625 |
| PLA plasticized with triacetin (1 day soak) | 13 | 21.2 | 0.15625 |
| PLA plasticized with triacetin (2 day soak) | 16 | 20.5 | 0.0625 |
| PLA plasticized with triacetin (3 day soak) | 16 | 18.8 | 0.03125 |
| PLA plasticized with triacetin (4 day soak) | 17 | 19.3 | 0.0625 |

*$T_g$ reported in Table 1 was determined from the second heating cycle from DSC curves.

Figure 4A:
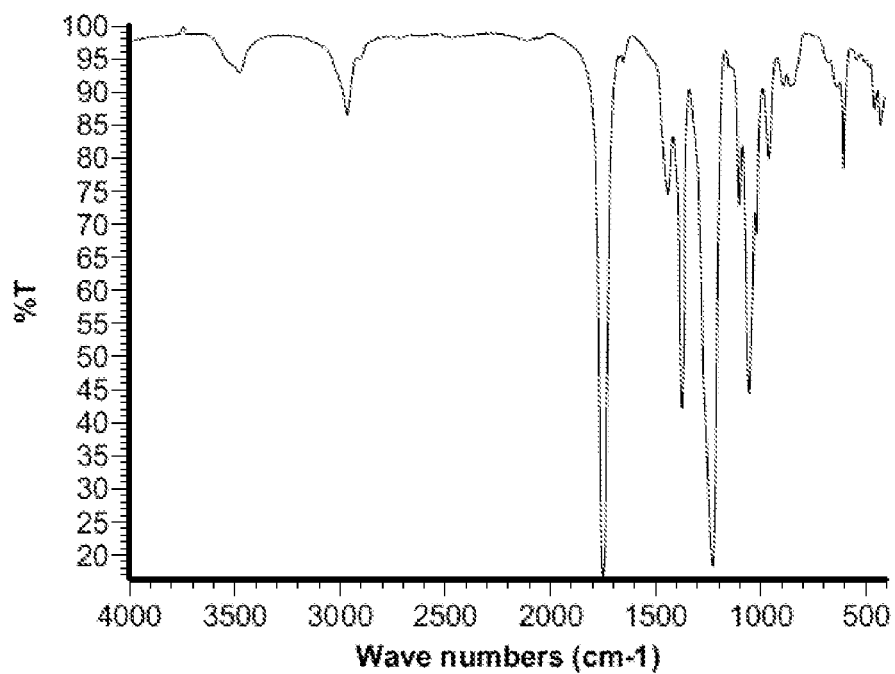
FIGS. 4A-B show FT-IR spectra as described in the Examples section.
Figure 4B:
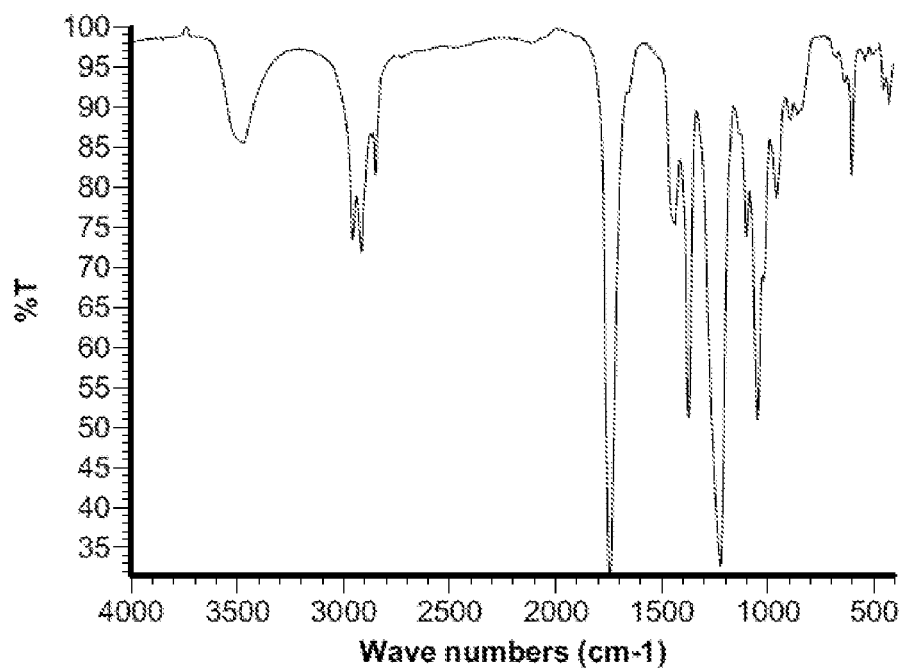

Additionally, the tap water after having had a test strip immersed therein for 4 days was analyzed for the presence of triacetin. 30 mL of water sample was extracted with 20 mL of chloroform twice to extract organic materials. The chloroform layer was directly smeared on a silver bromide IR plate and was scanned by a NICOLET 6700 FI-IR from Thermo Scientific. FIG. 4A shows the FT-IR spectrum of a triacetin standard. FIG. 4B, the chloroform extract of the water in which the test strip was immersed for three days, clearly shows that triacetin has leached into the water from the test strip.

Example 2

Figure 5A:
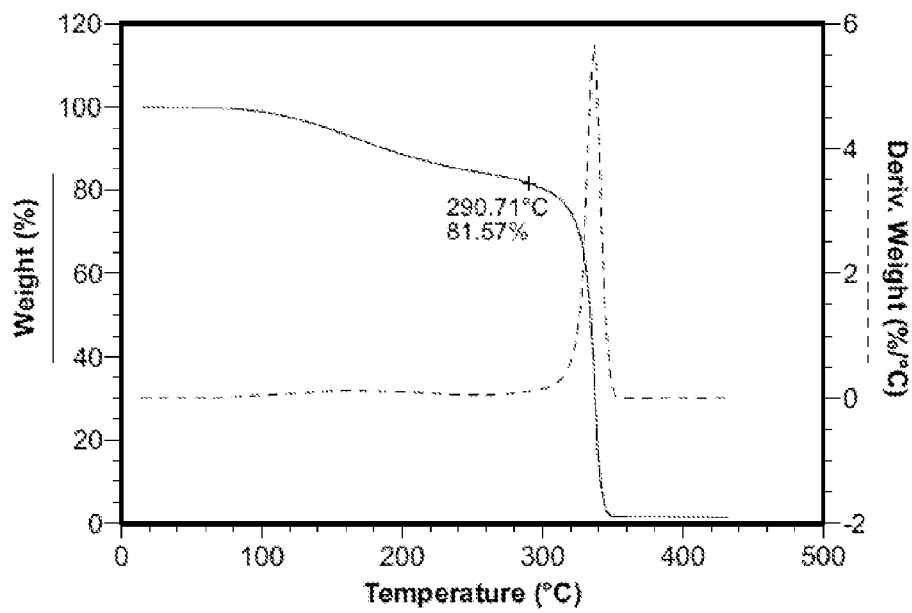
FIGS. 5A-B show thermogravimetric analysis results as described in the Examples section.
Figure 5B:
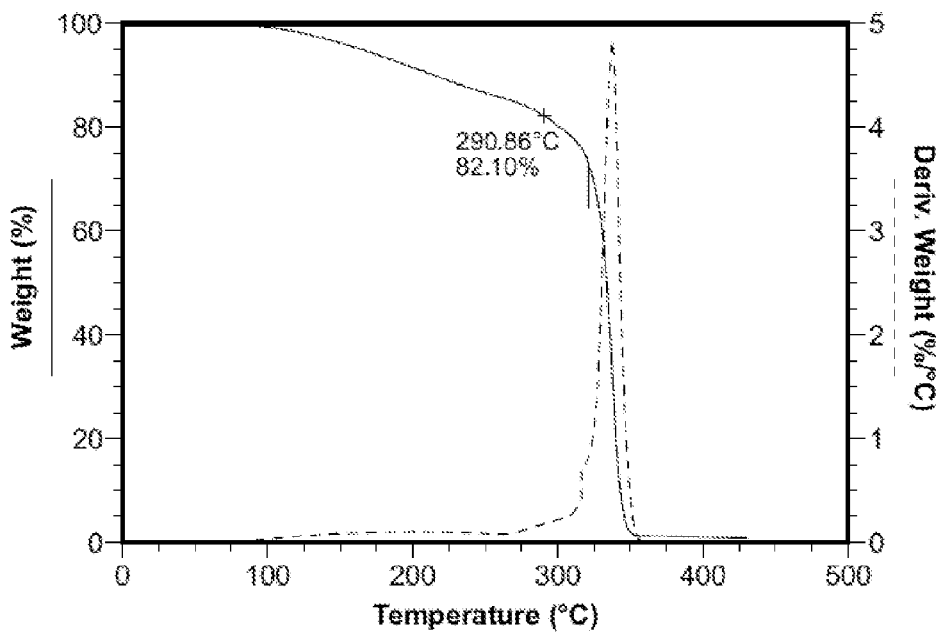

A poly(lactic acid) sample was plasticized with triacetin and test strips produced therefrom, as described in Example 1. Test strips were then placed in a vacuum oven (Fisher IsoTemp Vacuum Oven Model 201) at 120° C. and 22 in Hg. After 3 days and 11 days, test strips were removed from the vacuum oven and analyzed via TGA (FIGS. 5A and 5B, respectively). The results are provided in Table 2 below.

TABLE 2

| Sample | Weight Loss at 290° C. (%) |
| --- | --- |
| PLA (unplasticized) | 0.8 |
| PLA plasticized with triacetin | 27.1 |
| PLA plasticized with triacetin (3 days in vacuum oven) | 18.4 |
| PLA plasticized with triacetin (11 days in vacuum oven) | 17.9 |

As above, the weight loss at 290° C. indicates the amount of triacetin remaining in the plasticized polymer. This example demonstrates that leaching plasticizer into a gaseous environment (versus an aqueous environment as shown above) can be facilitated by reduced pressure and increased temperature.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
    providing a downhole tool or a component thereof comprising a plasticized polymer composition that comprises a polymer and a water-soluble plasticizer,
        wherein the plasticized polymer composition has a first deflection test value;
    exposing the downhole tool or the component thereof to an aqueous-based medium;
    allowing the water-soluble plasticizer to leach out of the downhole tool or the component thereof,
        wherein the plasticized polymer composition has a second deflection test value after exposure to the aqueous-based medium, and
        wherein the second deflection test value is less than about 10% of the first deflection test value; and
    placing the downhole tool or the component thereof in a subterranean formation.

2. The method of claim 1, wherein the downhole tool or the component thereof further comprises a material selected from the group consisting of a second polymer, a composite polymer, a metal, a ceramic, and any combination thereof.

3. The method of claim 1, wherein the plasticized polymer composition is included in a coating on the downhole tool or the component thereof.

4. The method of claim 1, wherein the polymer is nondegradable.

5. The method of claim 1, wherein the polymer is selected from the group consisting of a nitrile; a copolymer of acrylonitrile and butadiene; carboxylated acrylonitrile butadiene; hydrogenated acrylonitrile butadiene; carboxylated hydrogenated acrylonitrile butadiene; hydrogenated carboxylated acrylonitrile butadiene; a fluorocarbon; tetrafluoroethylene; perfluoroelastomer; a polychloroprene rubber; a natural rubber; polyether urethane; a styrene butadiene rubber; ethylene propylene; ethylene propylene diene; polyphenylene sulfide; polyetherketone-ketone; polyetheretherketone; polyetherketone; polytetrafluorethylene; a polysulphone; an acrylic-based resin; an epoxy-based resin; a furan-based resin; a phenolic-based resin; a phenol/phenol formaldehyde/furfuryl alcohol resin; poly(vinyl alcohol); polyamide 6; polyamide 6/6; acrylic; acrylonitrile butadiene styrene; ethylene vinyl alcohol; a polycarbonate/polyethylene terephthalate polyester blend; polyethylene terephthalate; an unreinforced polycarbonate/polybutylene terephthalate blend; polyetherimide; polyphenylene ether; a molded polyphenylene sulfide; a heat resistant grade polystyrene; polyvinylbenzene; polyphenylene oxide; a blend of polyphenylene oxide and polyamide 6/6; acrylonitrile-butadiene-styrene; polyvinylchloride; a fluoroplastic; polysulfide; polypropylene; styrene acrylonitrile; polystyrene; phenylene oxide; a polyolefin; polystyrene divinylbenzene; a polyfluorocarbon; a polyamide imide; any derivative thereof; any copolymer thereof; and any combination thereof.

6. The method of claim 1, wherein the polymer is a polyester.

7. The method of claim 1, wherein the water-soluble plasticizer is selected from the group consisting of glycerol; propylene glycol; polyethylene glycol (PEG); diacetyl monoacyl glycerol; an epoxy derivative of polypropylene glycol; polyethylene oxide; tributyl citrate oligomers; triethyl citrate; acetyltributyl citrate; acetyltriethyl citrate; trioctyl citrate; acetyl trioctyl citrate; trihexyl citrate; acetyl trihexyl citrate; trimethyl citrate; 1,2-cyclohexane dicarboxylic acid diisononyl ester; alkyl sulfonic acid phenyl ester; a glucose monoester; a partially fatty acid ester; PEG monolaurate; an acetic ester; triacetin; poly($\epsilon$-caprolactone); poly(hydroxybutyrate); glycerin-1-benzoate-2,3-dilaurate; glycerin-2-benzoate-1,3-dilaurate; ethylphthalylethyl glycolate; glycerine diacetate monocaprylate; poly(propylene glycol) dibenzoate; dipropylene glycol dibenzoate; ethyl phthalyl ethyl glycolate; poly(ethylene adipate) disterate; di-iso-butyl adipate; bis(butyl diethylene glycol)adipate; any derivative thereof; any copolymer thereof; and any combination thereof.

8. The method of claim 1, wherein the plasticized polymer composition further comprises an additive.

9. The method of claim 1, wherein the water-soluble plasticizer is about 1% to about 50% (w/w) to the polymer.

10. The method of claim 1, wherein about 1% to about 100% of the water-soluble plasticizer leaches out of the plasticized polymer composition relative to an initial concentration of water-soluble plasticizer in the plasticized polymer composition.

11. The method of claim 1, wherein exposing the downhole tool or the component thereof to an aqueous-based medium is placing the downhole tool or the component thereof into the subterranean formation.

12. The method of claim 1, wherein the aqueous-based medium is native to the subterranean formation.

13. The method of claim 1 further comprising:
    allowing the plasticizer to degrade to form an acid.

14. A method of implementing a screen, the method comprising:
    providing a screen comprising a plasticized polymer composition,
        wherein the plasticized polymer composition comprises a polymer and a water-soluble plasticizer, and
        wherein the plasticized polymer composition has a first deflection test value;
    placing the screen in a wellbore penetrating a subterranean formation;
    exposing the screen to an aqueous-based medium; and
    allowing the water-soluble plasticizer to leach out of the screen;
        wherein the plasticized polymer composition has a second deflection test value after exposure to the aqueous-based medium, and
        wherein the second deflection test value is less than about 10% of the first deflection test value.

15. The method of claim 14, wherein exposing the screen to an aqueous-based medium is placing the screen into the wellbore.

16. The method of claim 14, wherein the screen further comprises a material selected from the group consisting of a second polymer, a composite polymer, a metal, a ceramic, and any combination thereof.

17. The method of claim 14, wherein the plasticized polymer is a coating on the screen.

18. The method of claim 14, wherein the plasticized polymer is a matrix for the screen.

19. A method comprising:
   providing a downhole tool or the component thereof comprising a plasticized polymer composition,
      wherein the plasticized polymer composition comprises a polymer and a water-soluble plasticizer, and
      wherein the plasticized polymer composition is characterized by a $T_{g(BE)}$;
   exposing the downhole tool or the component thereof to an aqueous-based medium wherein after exposure to the aqueous-based medium the plasticized polymer composition is characterized by $T_{g(AE)}$;
   allowing the water-soluble plasticizer to leach out of the plasticized polymer composition to the extent that $T_{g(AE)}$ is between about 5° C. and about 100° C. higher than $T_{g(BE)}$; and
   implementing the downhole tool or the component thereof in a subterranean formation.

20. The method of claim 19, wherein the downhole tool or the component thereof further comprises a material selected from the group consisting of a second polymer, a composite polymer, a metal, a ceramic, and any combination thereof.

21. The method of claim 19, wherein the plasticized polymer composition is a coating on the downhole tool or the component thereof.

* * * * *